United States Patent [19]

Shaw

[11] 3,744,070
[45] July 10, 1973

[54] TRANSPORTING AND LAUNCHING ARRANGEMENTS FOR AMPHIBIOUS CAMPERS

[76] Inventor: Robert H. Shaw, 131 Oakwood Lane, Ithaca, N.Y. 14850

[22] Filed: Apr. 29, 1971
[21] Appl. No.: 138,613

[52] U.S. Cl.................... 9/1 T, 114/61, 114/66.5 F
[51] Int. Cl. .......................................... B63c 13/00
[58] Field of Search .................... 9/1 T, 1 R, 2 R, 9/2 F; 114/61, 66.5 F; 115/1 R, 1 A; 280/482, 414 R, 414 A

[56] References Cited
UNITED STATES PATENTS

| | | | |
|---|---|---|---|
| 3,530,519 | 9/1970 | Levinson | 9/1 T |
| 3,300,796 | 1/1967 | Powers | 9/1 T |
| 2,658,769 | 11/1953 | Forney | 280/482 |
| 3,175,234 | 3/1965 | Kutsi | 9/2 F |
| 2,865,031 | 12/1958 | Maloney | 9/1 T |
| 3,158,387 | 11/1964 | Martin | 280/482 X |
| 3,629,884 | 12/1971 | Brown | 9/1 T |

*Primary Examiner*—Milton Buchler
*Assistant Examiner*—E. R. Kazenske
*Attorney*—Birch & Birch

[57] ABSTRACT

A pontoon raft, boat or the like with land supporting wheels which is arranged for road travel when towed by a camper loaded vehicle and also which is provided with laterally wide spread water supporting pontoons. The wheels are journalled on a retractable carriage and are raised and lowered by manually controlled means arranged to provide torque in torsion spring means mounted to assist in movement of the retractable carriage. The pontoons, which are alternately raised and lowered to inboard and outboard positions, are likewise by manually controlled means arranged to arm and relax torsion spring means operatively associated with each pontoon for assisting in raising or lowering the pontoons for alternate land to water or water to land travel.

Also, in combination with the transfer from land to water and vice versa, there is provided a telescopic draft means, extensible for launching and retractible for de-launching, as the pontoon raft is transferred from land to water and vice versa.

Such use of the pontoon raft may be as a houseboat by transfer of a vehicle carried camper body to the raft deck. The transfer of a truck camper from a truck to a raft deck is the foundation of this invention and the various techniques and mechanisms are supplemental to that essential goal, including launch and recovery.

7 Claims, 16 Drawing Figures

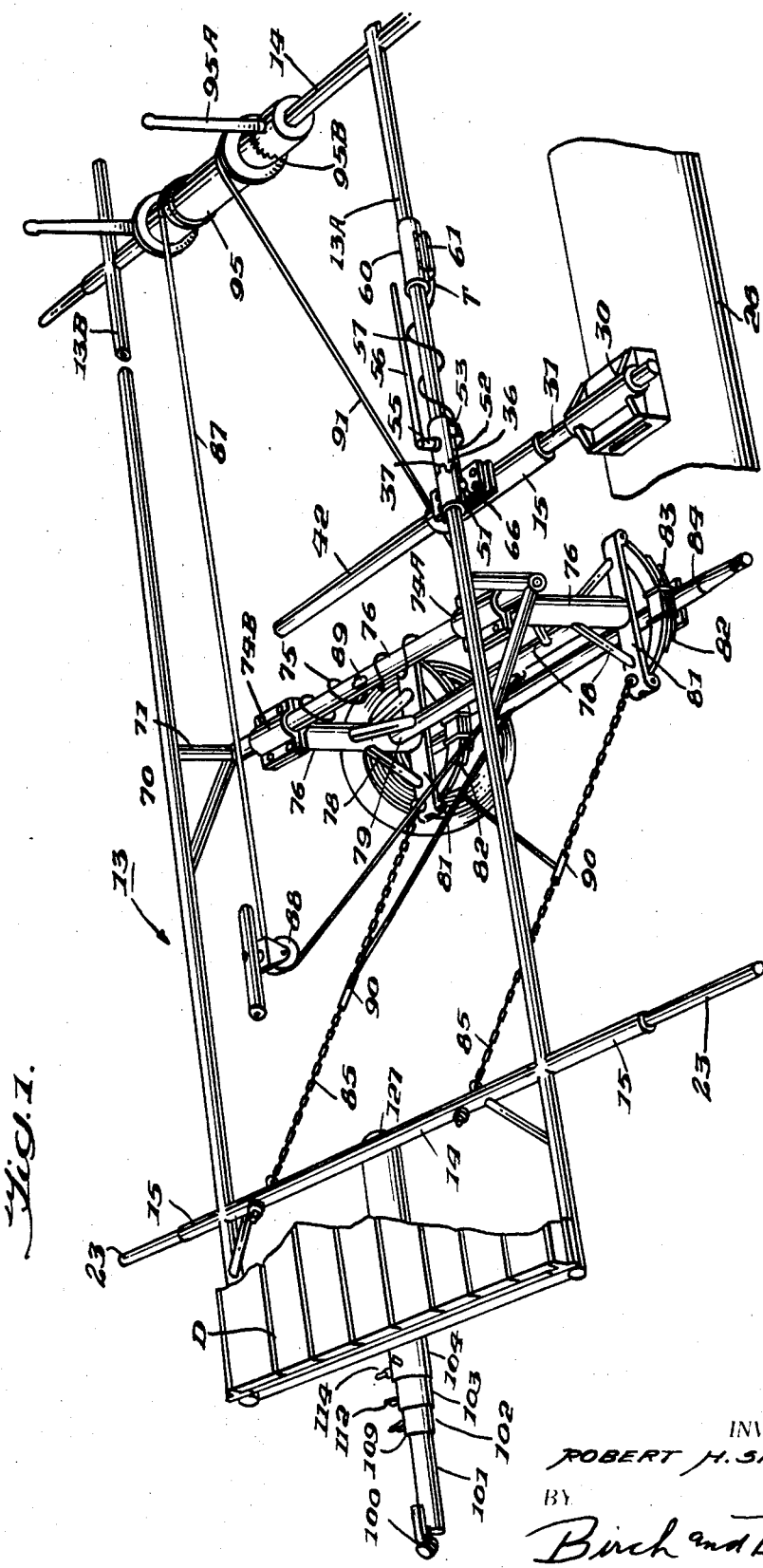

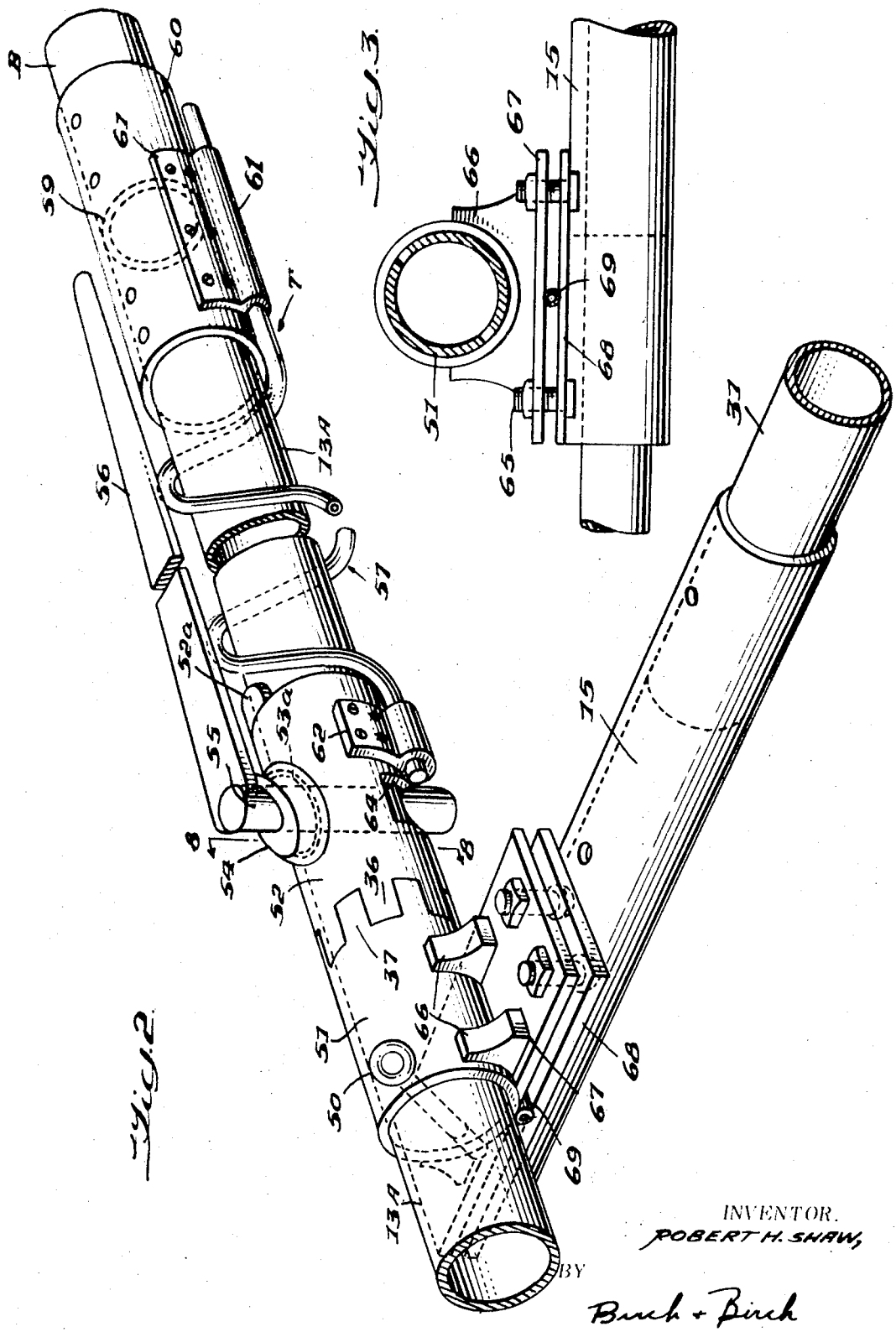

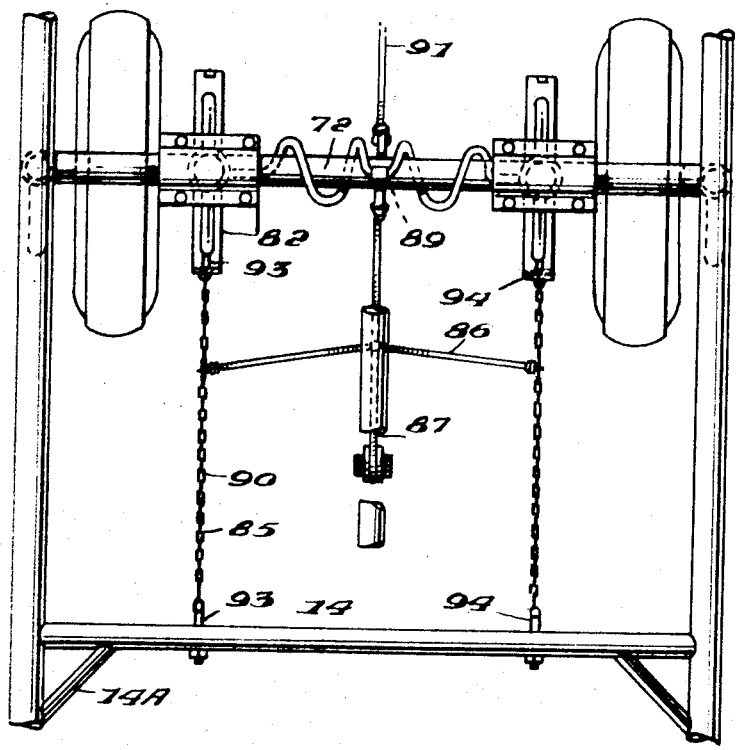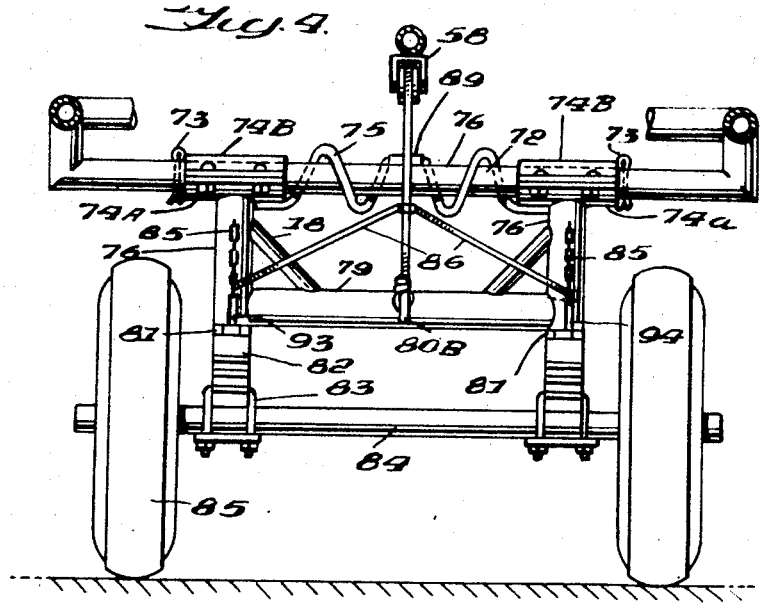

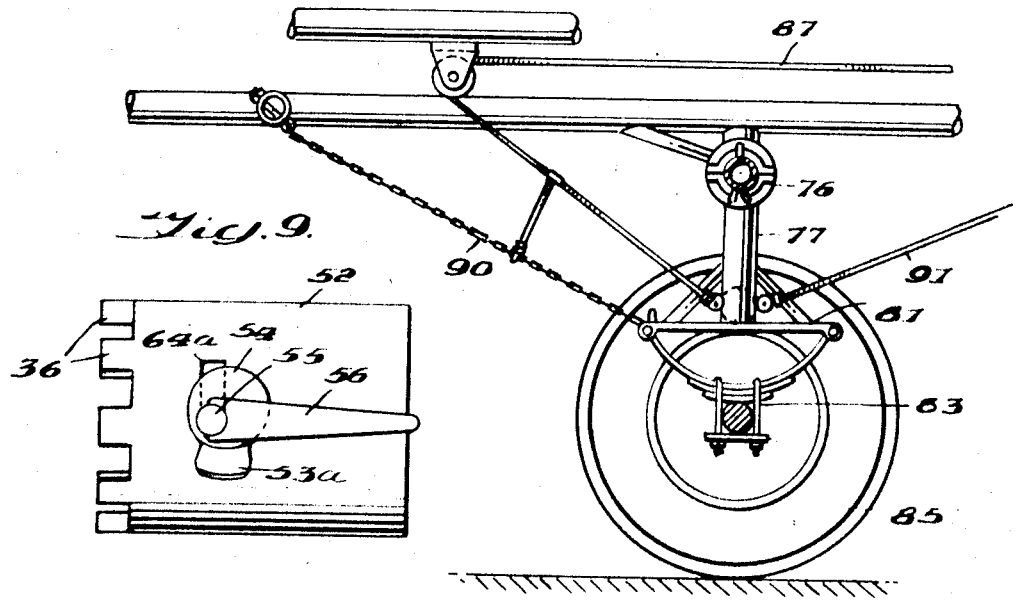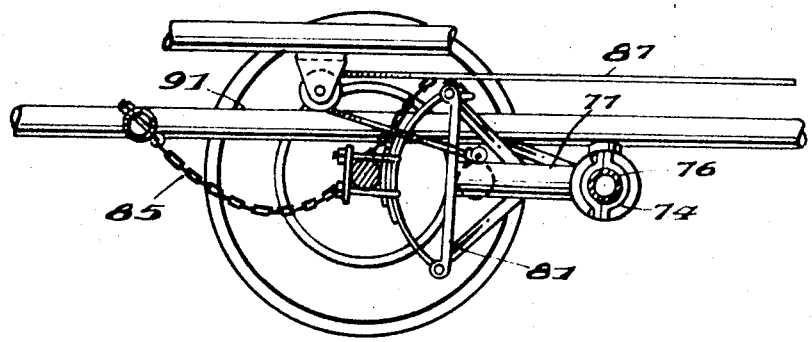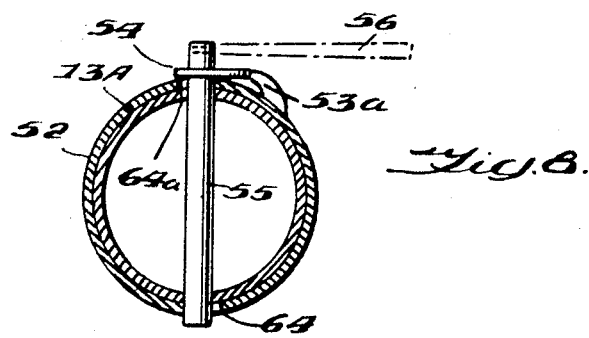

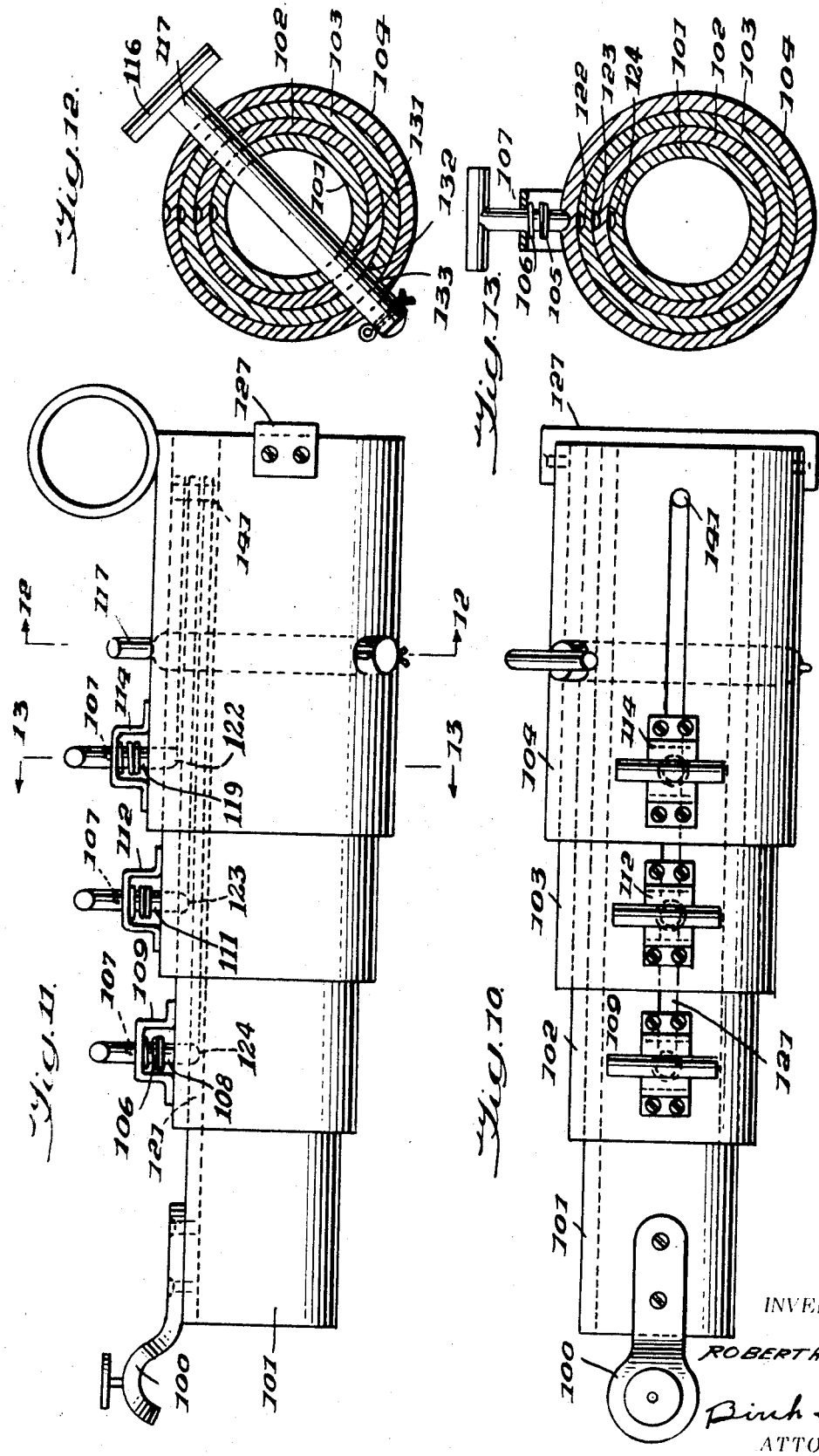

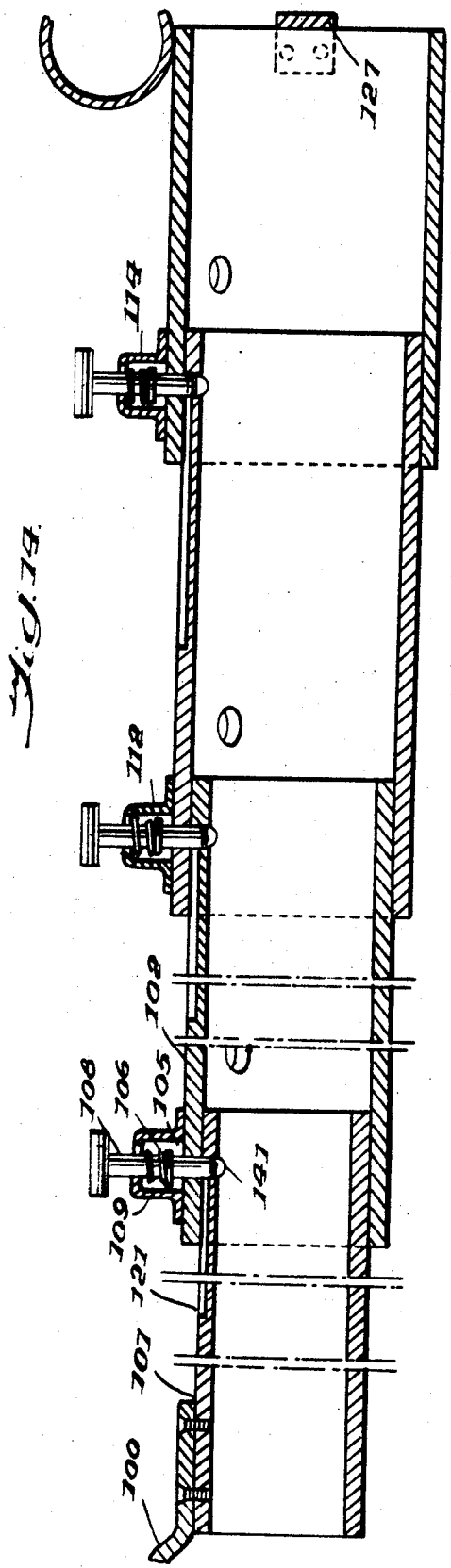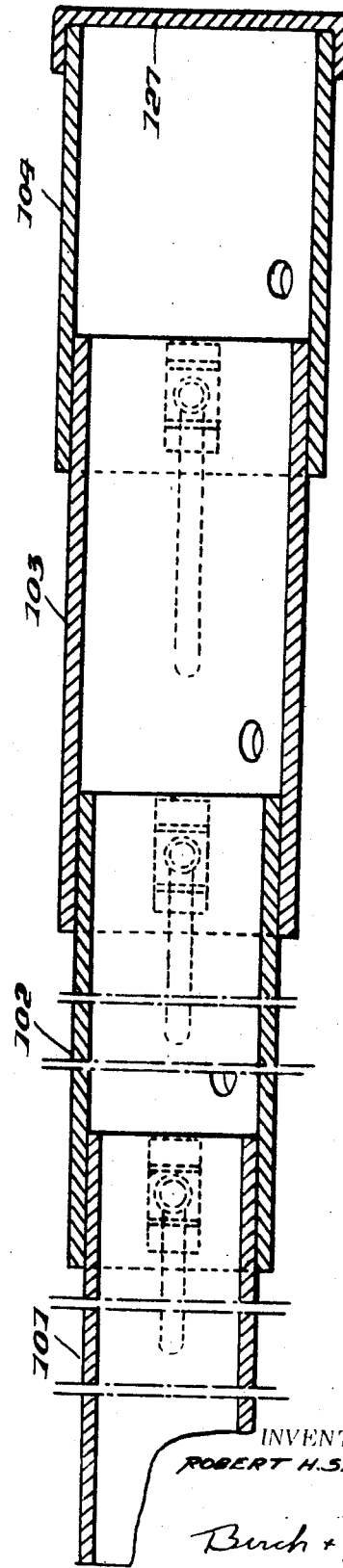

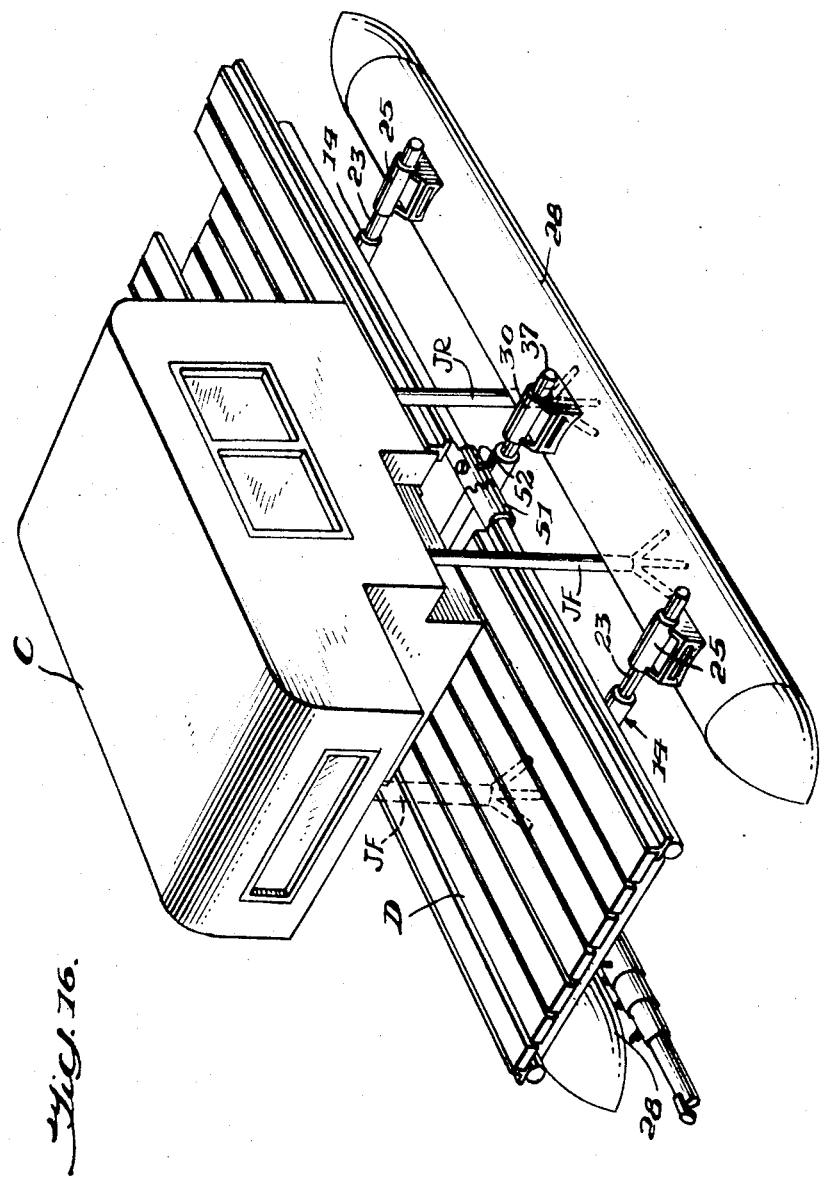

TRANSPORTING AND LAUNCHING ARRANGEMENTS FOR AMPHIBIOUS CAMPERS

My invention relates to improvements in pontoon supported boats, rafts and the like. It pertains specifically to the matter of using an ordinary truck camper as a houseboat. The most apparent way to move a truck camper from truck to raft is to draw the raft under the camper. But a seaworthy raft must be too wide to move between the vertical jacks on which the camper sits when free of the truck. The conflict of camper jacks and pontoon support members of the raft presents a problem which this invention uniquely solves. Other parts of the invention pertain to operation of the whole rig before and after the transfer of the camper.

This invention is particularly directed to improvements in my prior co-pending application Ser. No. 12,935, filed Feb. 20, 1970, wherein linkage means are illustrated for raising and lowering the pontoons.

This application pertains to three novel improvements to the mechanisms described and claimed in application Ser. No. 12,935:

1. As to means to swing pontoons inboard for storage and outboard for floatation; this invention eliminates the need for powered mechanisms, substituting therefor a torque spring. In addition it eliminates the awkward two step sequence in swinging the pontoons thru approximately 180° of arc, substituting therefor a smooth swing the full span of the arc.

2. As to highway transportability; this invention eliminates the necessity for transportation of the raft, as on a truck trailer, substituting therefor retractable wheels as an integral part of the raft.

3. As to launching the raft; this invention provides a novel telescopic draft bar where no draft bar previously was provided. This novel draft bar has been necessitated in the invention, taken as a whole, by the substitution of above mentioned integrated wheels in place of a trailer for transporting the raft as referred to in application Ser. No. 12,935. Whereas launching from a trailer previously was over the rear of trailer into deep water, launching the whole rig, wheels and all, requires a long draft bar to reach deep water, a draft bar which is too long for highway transport. Hence the rig requires a telescopic draft bar in the interest of greater efficiency in handling.

Heretofore, pontoons on camper carrying rafts have been permanently affixed or manhandled without mechanical aids, except that my copending application Ser. No. 12,935 provides power mechanism to move pontoons from inboard highway position to outboard floatation position. This invention proposes to substitute a torsion spring as mechanical means for moving pontoons in place of the electric and hydraulic operated power mechanism. Heretofore, the power mechanism required electric power, a hydraulic piston and linkage, and a two step operation involving resetting the linkage. This invention eliminates all such power means. Furthermore, whereas the prior art may have required more than one man operation, this invention permits operation by one man working alone.

An object of the present invention is to compensate for pontoon weight by torsion spring means to assist in the raising or the lowering of the pontoons to inboard or outboard position with respect to the raft deck, thereby permitting movement of the pontoons by one man.

A further object is to remove the conflict of camper jack and pontoon lifting arm by removal of the arm while preserving the full force of the spring which provides lift to the arm. The object is to transfer the force of the lift spring off the lift arm and onto a bolt and cam device.

Another object is to provide in combination with a pontoon boat, raft or the like an undercarriage including land engageable wheels, to thereby permit highway travel and provide for transfer from land to water with efficiency not heretofore possible.

Another object is to provide a trailer and pontoon raft including in combination, laterally swingable pontoons, a longitudinally swingable wheel carriage, and an extensible draft bar or telescopic tongue for tow connection with a suitable tow vehicle, which draft bar is adapted to impart thrust to the trailer and pontoon raft, whereby the same may be thrust well off shore for the launching operation.

Yet another more specific object is to provide novel means to facilitate the alternate raising and lowering of the respective land wheels and the pontoons to their respective desired positions for mobility on land or water with minimum effort on the part of an operator.

Still another object is to provide torsion spring means to selectively assist to raise or lower the land wheels and or to raise or lower pontoons when desired.

Another object is to so construct the frame of the raft that the attached mechanisms and assemblies can be built in place upon the frame.

With the above and other objects and advantages of the invention in view, the invention is best understood by reference to the accompanying drawings, wherein an embodiment of the invention is illustrated. In The Drawings:

FIG. 1 is a perspective view of the frame, wheel carriage draft bar and torsion spring devices for assisting in the raising and lowering of the pontoons and wheel carriage when desired;

FIG. 2 is a perspective view of the side of the frame of the raft showing the clutch members and connecting sleeve members associated with the torsion spring and of the tubular arms leading to one of the pontoons at the side of the raft. This Figure also shows the cut in the side member of the raft which permits assembly of the parts. It also shows the teetering alignment device.

FIG. 3 is a transverse section view taken at the junction between the side rod of the raft body and the pontoon connecting rod or arm showing the teeter alignment device;

FIG. 4 is an end view of a portion of the main frame and an illustration of the undercarriage in lowered position for land travel;

FIG. 5 is a top plan view of a portion of the main frame showing the undercarriage and the torsion spring and the raising and lowering mechanism for the undercarriage;

FIG. 6 is a side view of the undercarriage positioned for road travel below the frame structure of the raft;

FIG. 7 shows a side view of the undercarriage and its wheels in raised inactive position as it appears when the pontoons are in lowered water engaging position;

FIG. 8 is a transverse section view taken on line 8 — 8 of FIG. 2;

FIG. 9 is a top view in elevation of one of the sleeve members and the clutch teeth and bolt slot thereof with the cam and handle operator, said sleeve being connected as in FIG. 2 to the novel torsion spring depicted therein;

FIG. 10 is a top plan in elevation of the novel tow and launching draft bar in collapsed position;

FIG. 11 is a side elevation view of the tow and launching bar in collapsed position and latched to be retained in non-extensible position;

FIG. 12 is a transverse view taken on section line 12—12 of FIG. 11;

FIG. 13 is a transverse view taken on section line 13—13 of FIG. 11; and

FIGS. 14 and 15 show side and top plan view of the tow bar or draft means extended for launch positions;

FIG. 16 is a perspective view of a raft with pontoons at each side and a camper body attachment, but with the wheeled undercarriage pontoon lift torsion spring and draft bar removed.

Referring to the drawings and first with particular reference to FIGS. 1, 2 and 3, there is shown a perspective view of one side of the mounting members for the respective pontoons and the land wheel carriage structures. The pontoons are not shown in detail in these Figures for the sake of clarity of the working parts, however, see FIG. 16 for the pontoons in more detail.

It is to be understood that each respective side of the frame member 13 of the raft body is in substantial duplicate of the other, each having a pontoon 28 mounted on tubular part 15. The frame member 13 is formed of tubular sections 13A and 13B on each side of the raft on which torsion spring means 57 to assist in raising and lowering the pontoons is installed.

The raft frame member 13, shown in FIG. 1, on each side is comprised of spaced side bars 13A from the bow of the frame which are coupled and aligned with spaced side bars 13B leading to the stern of the raft by a coupling collar 60.

Thus the frame member 13 at each side is made of fore and aft sections 13A and 13B with the aligned free ends of each section held together within the coupling collar 60. The coupling collar is removable so that the respective ends 59 of section 13A and 13B may be forced to misaligne to permit assembly of a torsion spring assembly T onto the respectively oppositely spaced side section 13A of the frame member 13. This novel torsion spring assembly T comprises spaced sleeve members 60 and 52 to which the ends of each torsion spring 57 are attached by suitably mounted saddle plates 61 and 62. This spring loosely coils or wraps around each of the side bars 13A, see FIGS. 1 and 2, and the forward sleeves 52 are each formed with clutch teeth 36. These clutch teeth are slidably engageable and disengageable with mating teeth 37 on the sleeve 51 mounted for lateral extension on a plate 67 and cradled on the plate by vertical cradle arms 66. The support plate 67 is suitably secured to tubular rods or sleeves 15 and coupled with pontoon holding arms or shafts 31 which fit in bearing sleeves 30 suitably secured to top portions of the respective pontoons 28, as shown in FIGS. 1 2 and 16.

When the clutch teeth 36 and 37 are engaged, the torsion spring 57, which has been placed under winding torque by the lowering weight of the pontoons, will cause the sleeve 51 to turn to raise the pontoon shaft parts 15 and 31 with the pontoons 28 to an inactive position and direct the pontoons to an inboard road travel position over the raft frame at each side thereof onto raft deck D.

As shown in FIGS. 1, 2 and 3 the pontoon connecting arms 15 and 31 are arranged by means of cylindrical rock bar 69, so 31 mounts, for example, in the bearing sleeve 30, see FIGS. 1 and 16. The clutch sleeve 51 around the side member 13A is supported on a plate 57, being supported by and resting in reinforcing and spacing cradles 66 attached to plate 67, which in turn is secured by suitable means such as bolts 65 to lower plate 68 in spaced relation on each side of cylindrical rock bar 69. The assembly is so arranged that shortening and lengthening the bolts 65 has the effect of finely adjusting the direction of orientation of connecting arms 15 and 31 to aline suitably with bearing sleeve 30. When the pontoons are moved from floatation or water outboard position to inboard highway transport position, the pontoon connecting shaft 31 must rotate approximately in an arc of 180°. The nature of this movement is such that the respective pontoons 28 are spring biased when starting from either terminal end of the arc of swing from inboard or outboard position by the tension torque of the torsion spring 57.

Thus to assist in the arcuate swing, spring tension is provided when the pontoons 28 carried by arm 31 are at the start on either end of the arc of swing. The spring 57 is so arranged and so proportioned as to be relaxed at approximately 90° of the arc of swing, when the pontoons, for example, are at the top of their swing from the raft deck D on either side of frame member 13A to the down outboard wide spread pontoon floatation position for water travel.

As in my copending application above referred to, the raft body may be drawn under a camper normally set up on jack means not shown, and in some instances in such a manner as to necessitate removal of the center pontoon connecting rod or arm 31, to eliminate conflict with a camper jack. The pontoon holding arm or connecting rod 31 cannot be removed while bound in the pontoon bearing sleeve by the tension imparted from spring 57 to the clutch sleeve 51.

A critical aspect of this invention is to provide for relaxing the tension between various members of the pontoon holding arms assembly 15, 31 and 30 without loss of the torque tension stored in the torsion springs 57. This is accomplished by the cam 54 mounted around an opening on the mating clutch sleeve 52 which cam in cooperation with a handle 56 and operating against shoulder 53a provides for some slight additional rotation of the spring 57. This additional rotational torque causes all pontoon weight to rest only on the bow and stern pontoon holding arms 23 and thereby leaves the clutch teeth 36 and 37 and the sleeve connections with the pontoon arms 15 and 31 completely relaxed.

The mating clutch parts 36 and 37 can then be disengaged, the central pontoon arm 31 can be removed, and the relatively shorter sleeve or rod 15 can be freely rotated downward so the camper loading operation may go forward without obstruction between the raft structure and any camper supporting jacks. Upon completion of camper loading, the center pontoon holding rod or shaft 31 is replaced.

Fitting the raft for highway transport is a reverse operation, whereby the tension on the spring 57 is maintained, and at a suitable time assists to raise the pontoons by hand, to position them inboard on the raft deck.

Now with further reference to the details of the torsion spring pontoon lifting assembly, the same is mounted by the sleeves 52 and 60 referred to hereinbefore as a coupling collar, see FIG. 2. This collar has the spring 57 secured in a saddle anchor plate 61 to an exterior longitudinal portion thereof and extends longitudinally in a coil around the side member 13A of the raft frame. The opposite end of the spring 57 is secured by a saddle anchor plate 62 suitably secured as by screws or rivets to clutch sleeve 52. Clutch member 52 is held in proper location by latch, such as a stud 52a adapted to engage between the bore of the sleeve 52 and the outer diameter of the side rod 13A, and results in latched engagement of the clutch teeth 36 of the sleeve with clutch teeth 37 of sleeve 51. Such engagement of the clutch teeth is further provided by latch pin 50, see FIG. 2, inserted through an opening formed in the bar or rod 13A at each side of the raft frame, to thereby abut the peripheral edge of the sleeve 51 opposite to the engaging clutch teeth.

When the clutch latch pin 50 is removed, the clutch members may be disengaged after the applied tension from spring 57 has been transferred to bolt 55. This is done at each side of the raft frame, since the parts are duplicated on the opposite side frame bar 13A. Such action on the spring 57 to relieve clutch tension is accomplished by the insertion of a bolt 55 through suitably positioned holes in side bar 13A of the raft frame and by rotating the cam 54 secured to the upper end of the bolt 55. The bolt 55 with the cam is turnable by the handle 56 when the handle is manually adjusted. For example, when the handle 56 is turned with the bolt 55 and cam 54 the cam engages a shoulder 53a, see FIG. 2, causing a slight turning of the sleeve 52, to thereby counteract the biasing torque of the spring 57, thus temporarily releasing the pressure between the clutch teeth 36 and 37, while preserving the bias action of the spring.

In order to permit the clutch member 52 to be turned by the hand lever 56 and cam 54, radial slot 63a and 64 are in the clutch sleeve 52 so the sleeve may turn free of the bolt 55.

With the pressure relieved on the clutch teeth, the same can be declutched by sliding sleeve clutch member 51 on side bar 13A when bolt 50 at the end of the sleeve is withdrawn.

The clutch sleeve 51 around the side bar 13A is supported on a plate 67 and rests in a reinforcing cradle 66 and plate 67 is secured by suitable means such as bolts 65 to a lower plate 68 in spaced relation on each side of a cylindrical rock bar 69.

When clutch teeth 37 are disengaged and clutch sleeve 51 is free to rotate on the side bar 13A the pontoon arm 31 can be withdrawn from the pontoon and from arm 15 and the tubular rod section 15 can be directed point downward.

The rocker bar 69 between the plates 67 and 68 permits fine adjustment of pontoon alignment rod section or arm 15 by the adjustment of the corner bolts 65 such that arms 15 and 31 properly aline when pontoon weight is on arms 15 and 31, and arms 15 and 31 properly aline when pontoon weight is on arms 15 and 31. Accordingly, when the pontoons at each side of the raft deck are to be lifted from float position by rotation of clutch sleeve members 51 and 52 under the bias action of torsion spring 57, the bolt 55 is first removed from side bar 13A. Then since the tension to provide torque on spring 57 is suitably adjusted to provide a relaxed spring when the pontoons are approximately at halfway between float position and transport position, the torsion spring 57 assists in the lift from either up or down swing from either inboard or outboard positions relative to such half-way point. The cradles 66, FIGS. 2, 3, give necessary spacing so that arm 15 can come inboard without conflict in position with deck D, being completely above the deck.

RETRACTABLE UNDERCARRIAGE WHEEL ASSEMBLY

The retractable wheel undercarriage, shown in FIGS. 1, 4, 5, 6 and 7, are suitably designed to provide a trailer adapted to tow with a novel retractable and extensible tow bar, shown in FIGS. 10 - 15, behind a camper loaded truck on the highway. This undercarriage is provided with means to be lifted clear of the water when the camper loaded raft is supported by pontoons in the water. Also, to boost and assist the lifting of the undercarriage there is provided a torsion spring 75 coiled around a cross bar 72. The bar is secured at each side to side bars 13A - 13A of raft frame by struts 70 and 71 and has thereon spaced bearing members 74A and 74B so the carriage comprised of struts or legs 76 can swing around the cross bar to down road engagement and to inactive raised positions, as hereinafter explained with reference to the structural features thereof.

Each bearing member 74A and 74B is secured to a respective leg of the undercarriage, each leg being braced by angle brace means 78 and cross brace 79. Across the base of each leg and below the cross brace 79 is a truss 81 to each end of which is pivotally anchored the opposite ends of an outwardly bowed leaf spring 82 or suitable coiled spring not shown. The arcuate mid-section of this spring 82 secures by U-bolt means 83 to an axle 84 with highway wheels journalled to rotate on each end of the axle.

At a distance on frame member 13A from arm 15, there is a cross bar 14, the distance being determined by the distance between lift jacks of the camper. Each cross bar may be braced by an angle brace 14A. Chains 85 from eyelet bolts 93 and 94 are suitably secured to the front end of each truss portion 81 of the leaf spring means 82. These chains serve to hold and regulate the undercarriage assembly in correct down position and adjustment of the chain means is provided by turnbuckles 90 intermediate each chain 85.

When the wheel carriage is down the same is held in position by tension of a cable 91 reeved around a winch 95 and anchored at one end to eyelet bolt 80B. This winch is turned by a handle 95A and may be held by a clutch 95B, said winch being rotatable on cross bar 14 of the frame or otherwise suitably installed, see FIG. 1.

Release of clutch 95B relieves tension on cable 91 and tension may be applied to cable 87 from the winch member, said cable leading over pulley 88 and fastening centrally by eyelet bolt 80B to the wheel cross bar 79. When the cable 91 is relaxed from a taut condition by declutching the winch, the cable 87 which is oppositely wound on the winch drum may be turned and the wheel assembly is lifted with bearing means 74B rotating on cross member 76, whereby the wheels lift into suitable deck wells, not shown.

A cross connected cable 86 to eyelet connections of turnbuckles 90, see FIG. 1, when properly applied compensates for undesired slack in chains 85 as they relax under action of hoist cable 87. Also, the cotter pins 73 at each outer end of the bearing means 74A and 74B, may be provided to pilot or set the bearing means on the cross bar 72 at proper spacings. A torque spring, wound on cross bar 72, is fastened at each end to the bearing members 74A by anchor saddles and at the center of cross bar 72 by anchor 89, and this torsion spring is calibrated to assist the lift of the wheel carriage by the cable 87, see FIG. 4.

TELESCOPING TOW AND LAUNCHING DRAFT BAR

The telescoping tow and launching draft bar provides for maximum efficiency in a one man launching operation and comprises a plurality of telescoping sections 101, 102, 103 and 104. The lead section 101 includes a tow truck coupler 100 and the rear section 104 is suitably secured to the front cross bar 14 of the raft frame, see FIG. 1.

These sections are formed of tubular stock and are slidably telescopic with each other and when retracted within each other their respective rear positions abut a backing cap 127 and are each formed with diametrically opposite openings 131, 132 and 133, which when the sections are in total collapsed position align with each other, as shown in FIGS. 10, 11 and 12, to receive a locking bolt 117 to hold the same in rigid collapsed position for highway towing of the raft unit, see FIG. 12.

The bolt 117 includes a handle 116 to facilitate removal and insertion in the tow bar openings and preferably includes a cotter pin 125 to hold the lock bolt in place.

Each telescopic section is formed with longitudinal grooves 122, 123 and 124 along the exterior surface thereof which are traversed by spring biased pins 108, 111 and 119, each formed with an exposed T-head. The pins are mounted and held in place by brackets 109, 112 and 114 and each pin is a replica of the other, thus a detail description of one of the pins only is necessary. Accordingly, with reference to pin 108, there is shown a stud 107 carried by the shank of the pin which may, when positioned in line with a slot in the associated bracket 109, see FIG. 11, be lifted thru the slot of bracket 109 against the bias action of a spring 106. So lifted, the pin 108 is clear of the hole 141 formed in section 101. When pin 108 is turned slightly while lifted, stud 107 will superimpose on bracket 109 such that pin 108 will remain in raised position in spite of the biasing action of the spring 106. The lift of pin 108 slightly to clear the hole 141 formed in section 101 is not enough to escape the longitudinal groove 122 in the section. As a result the end of pin 108 rides in the groove 122 of section 101 when this section is telescoped into section 102 and provides for keeping the openings 131, 132, 133 and 134 aligned as to torque in cooperation with the end piece 127 adapted to thereby keep the openings aligned for distance in the collapsed state of the tow bar. This automatic aligning of holes 131, 132, 133 and 134 makes possible insertion of bolt pin 117.

When the tow bar is collapsed the pin 108 can be set to drop under spring action by turning its stud 107 to register with the slot in the bracket 109, such that the stud is free to drop through the slot. However, as long as the pin 108 rides along in the groove 122 the pin cannot drop until it reaches hole 141. When the hole 141 is reached the pin 108 will drop into the hole by action of the spring 106 coiled around the pin between the interior top side of the bracket 109 and washer 105, see FIG. 14. The automatic action of the pin prevents the sections from completely separating, and makes possible the one man operation.

OPERATION AND USE OF THE INVENTION

The apparatus and the method of using the present invention combination of elements is believed reasonably clear from the foregoing description with reference to my co-pending application above identified, which shows a raft with a camper body and which is further shown in FIG. 16 of the drawings.

For example, upon arrival at a launch point, the truck with camper body and the towed raft are first aligned on level ground preparatory for launching. The camper body is released and raised from the truck on jacks, see FIG. 16. All cargo items aboard the raft are laid aside on the ground so that only the raised pontoons 28 on each side over the deck D of the raft remain. Then next the pontoons 28 are lifted with the assistance of the torsion spring means and individually lifted and swung to outboard position.

Because of the novel torsion springs 57 the lift of the pontoons is easily accomplished by one man and each pontoon 28 is supported by a single arm 31 attached in one of the bearing sleeve members 30 of the pontoon at its vertical center of gravity, see FIGS. 1 and 16.

There is thus provided a novel combination of cooperating members including a camper housing for transfer to a raft equipped with displacable pontoon members 28 and land engageable wheels of a wheeled undercarriage, whereby the pontoons are lowered for water travel and the wheel carriage with wheels is stored in the raft deck D or in some suitable position during use in water and whereby the pontoons are raised and stored on the deck D of the raft and the formerly stored wheeled carriage with wheels is lowered for highway travel. Also, further in co-acting relation with the alternate operation of the pontoons and the wheeled undercarriage is a novel tow and launching draft means adapted to coact with the pontoons and wheeled carriage for towing and for launching the raft.

When the pontoons are in floatation position the rearward pontoon holding arm 23 is set in place so that the pontoon is held at the center and at the rear, but not forward, leaving a slot or space between the raft deck and the adjacent side of the pontoon from the front to the center pontoon holding arm 15.

The camper body C may now be moved off the truck, which truck is not shown, onto the raft deck D, see FIG. 16. As the truck, not shown, moves forward, it slides out from under the camper C which may be suitably held raised above the ground on suitable jack means, such as JF and JR, and the raft is adapted to slide in under the jacked up camper. The camper rear jacks which are suitably positioned ride in the respective spaces between the sides of the raft and each pontoon until engaged with each center pontoon holding arm 15 and forward movement must be stopped. At this stage, the forward pontoon holding arm position has already passed the forward camper jack and hence the forward holding arm 23 can now be set in place without interferring with the camper jacks which are holding the camper housing as far as any subsequent movement thereof is concerned. The pontoons 28 are now held by their respective front rear and center arms 23 and 31 on their respective bearing sleeves 25 and 30 on the top of the pontoons.

Thus when mounting the camper body C onto the raft deck D, the center pontoon holding arm 31 must be removed, which otherwise would cause arm 15 to obstruct the camper jack, not shown. Approximately hundreds of pounds feet of torque are being exerted on the arm 15 by the torque spring 57, such that the various joints of the arm assembly 15–31 are bound and inseparable. By the novel arrangement of this invention the strain on the arm assembly may be released while at the same time preserving the energy stored in the torque spring.

To preserve the stored energy of the spring, a holder pin 55 is inserted through the rotating clutch sleeve 52 and through the side member of the raft frame 13A on which the sleeve rotates. The bolt 55 has a handle 56 and a cam 54 which operates against a shoulder 53a on the rotating clutch sleeve 52. As the handle is turned with the bolt, the cam forces slight additional rotation of the sleeve 52 against the torque of spring 57. This has the effect of rotating the center pontoon holding arm 15 downward slightly, thus shifting all pontoon weight to the fore and rear holding arms 14, 23, leaving the center holding arm 15 and 31 without weight. After the clutch latch pin 50 in the raft frame member 13A is removed, the clutch sleeve 51 can be moved to disengage clutch teeth 36 and 37, leaving the pontoon holding arm 15 relaxed in its union with arm 31. The arm 31 can now be separated from the pontoon bearing sleeve 30 and from arm 15 and the arm 15 now free to rotate, is permitted to hang downward thus leaving an unobstructed space between the raft deck D and the pontoon 28 all the way from the fore to the rear pontoon holding arms 23. The jacks temporarily used to support the camper is no longer obstructed by the middle pontoon arm 15 and the raft may now be pulled the remaining distance under the camper until the camper is properly positioned over the raft deck D. The jacks, not shown, are now operated to let the camper down on to the raft deck and the jacks JF and JR are removed.

The center pontoon holding arm 15 which has been made free to swing is now lifted into the operating position and a single shaft 42, see FIG. 1, is thrust through both of them from side to side of the raft so that they are immobile and prepared to carry a share of the load supported by the pontoons. The pontoons are again connected to the center holding arms 15 by use of arm 31. The clutch elements 36 and 37 remain open and cam bolt 55 continues to carry the tension of the spring 57.

The camper is suitably secured to the raft deck D, after a safety rail is installed on deck D and gear previously laid aside on the ground is put aboard, the raft is now ready to be launched.

With the raft, supported on the highway wheels of the undercarriage, aligned for launch, the main pin 117 of the telescopic draft bar is pulled and the section pins 108 are set in drop position with respect to the stud 107 and the slot in Bracket 109. For example, a truck, not shown, to which the raft draft bar may be coupled at coupler 100, moves relative to the raft and causes the draft sections to extend while the raft remains stationary or fixed until the draft bar arrives at its extended position. The section pins 108 follow their respective grooves 122 in each section and drop into holes 141, see FIGS. 14 and 15, firmly fixing the draft bar in an extended position. The truck now may be backed off and the raft is moved into the water until the wheels clear the bottom due to the floatation of the raft by the pontoons 28. The truck is then uncoupled from the coupler 100 of the draft bar and the section pins 108, 111 and 119 of the draft bar are lifted and turned in their respective brackets 109, 112, and 114 to hold them in retracted position and the draft bar sections are telescoped by hand and returned to the collapsed position thereof and locked in this position by the main bolt 117 which is inserted through the automatically aligned holes for this purpose.

By the winch 95 the carriage wheels are lifted clear of the water and the pontoons 28 take over, whereby the truck camper has now become a houseboat.

Getting back on the highway is a reverse operation. Since the hundreds of pound feet torque spring tension in springs 57 has been preserved even when its application has been released, it is available for materially assisting in lifting the pontoons 28 back onto the raft deck, so they can be lifted by one man. Thus the whole operation of transferring a truck camper from a truck to a raft and launching same, and recovery for road travel, can be accomplished by one man working alone without tools.

Without further description it is believed that the foregoing description is sufficiently complete and clear to enable others skilled in the art to practice the invention. However, it is to be expressly understood that although only one combined embodiment of the invention is described and illustrated in detail, that parts, arrangements and combinations of parts which may now occur to others are likewise intended to be within the scope hereof. To determine the scope of this invention reference should be had to the appended claims.

What is claimed is:

1. A system for transporting and launching a pontoon raft towed by a suitable vehicle comprising in combination, a raft with a deck portion having floatation pontoons on each longitudinal side bar of the raft, a wheeled undercarriage pivotally mounted below the raft deck portion and an extensible and retractable draft means for connection between the raft and the tow vehicle, side frame bars for pivotally mounting said pontoons, to thereby permit the same to swing in an arc from the stored raft deck to floatation position, said wheeled undercarriage including a cross bar and wheel struts being pivoted to swing into a raised inactive position when the pontoons are in floatation position and to swing to a lowered active land engaging position when the pontoons are up in an inboard inactive stored position on the raft deck, and said draft means being extensible when said wheeled carriage is in a lowered active position to launch said raft from land to water and said pontoons are subsequently moved to outboard floatation position and said wheeled carriage is raised to inactive position after floatation is taken over by the said pontoons, said side frame bar pontoon mountings each include a torsion spring adapted to develop torque at each end of the arc of swing in either stored or floatation positions of the pontoons, said torsion spring being coiled around said side frame bars and secured at each opposite end to a clutch assembly comprising mating clutch sleeves moveable on said respective side frame bars for said pontoon mountings.

2. A system for transporting and launching a pontoon raft, as described in claim 1, wherein said wheeled cross bar of the undercarriage is journalled in bearing means, said bearing means being connected to the opposite ends of a torsion spring coiled around said cross bar to assist in the raising and lowering of said undercarriage.

3. A system for transporting and launching a pontoon raft, as described in claim 1, wherein said extensible and retractible draft means attached to said vehicle is comprised of telescopic sections, said sections being formed with longitudinal grooves along exterior surfaces and spring bias transverse pins to latch said sections to set the length of the tow means for launching lengths, and provided with a backing plate and groove guides which together aline holes for a locking pin to set the said draft means at highway transport length.

4. A system for transporting and launching a pontoon raft as described in claim 1, including means for removing spring torque force from the clutch assembly while preserving the torque.

5. A pontoon raft or the like with a deck portion having land and water supporting means, said land supporting means comprising ground engageable wheels, said wheels being mounted on an undercarriage, said undercarriage being moveable to raised or lowered position, said undercarriage having a transverse bar pivotally mounted, torsion spring means mounted around said transverse bar, to thereby provide spring bias on said undercarriage when in ground engagement by the wheels thereof, said water supporting means comprising pontoon members swingably mounted on longitudinally extending bar means along each outboard side of the raft, laterally extending holding arms connected to each of said pontoon members and to said bar means along each outboard side, each having torsion spring means mounted around said longitudinal bar means, to thereby bias said pontoon means toward a raised position, spaced sleeve means to latch said land supporting means to ground engagement against the bias action of the spring, said torsion spring means around said longitudinal bar means along each outboard side of the raft being secured at each opposite end to spaced sleeve and collar means mounted on a central section of said respective longitudinal bar means, to thereby develop torque as the pontoon arms impart movement to the pontoons from an intermediate spring relaxed starting point of an arc of swing of the pontoons connected to their respective laterally extending arms toward a position placing the pontoons on the raft deck or toward a position in a reverse direction from said intermediate point toward a position placing the pontoons in a down floatation position, said swing of the pontoons on their respective lateral arm connections developing torque in the respective torsion springs at each end of the said arc of swing in either direction from said intermediate spring relaxed point of the arc, to thereby assist in the movement of the pontoons from an inboard raft deck position to said intermediate point of the arc and to assist in the lift of the pontoons from an outboard float position to said intermediate point of the arc, and means for relaxing tension of said spring means to permit free removal of said laterally extending arms selectively from said pontoons.

6. A system for transporting and launching a pontoon raft as described in claim 5, wherein said laterally extending arms are engaged at an end within a saddle sleeve on each pontoon, and including means for fine adjustment of the end of the arc of swing and alignment of the said laterally extending holding arms within the pontoon saddle sleeve.

7. A system for transfer of a land based camper supported by spaced jack supporting means along each longitudinal side thereof to the deck of a raft having side floatation pontoons supported on laterally extending arms along each longitudinal side of the deck, said arms being radially pivoted to each side of the raft to thereby permit swinging of the pontoons to and from outboard to inboard positions with respect to each adjacent longitudinal side of the deck of the raft, said pontoons being spaced from the deck edges on said arms and mounted on the free ends of said laterally extending arms from the deck, said arms being secured to spaced saddle connections on the surface of the pontoons and some of said arms being detachable from said pontoon saddles, to thereby permit an end positioned one of the jack supporting means of the camper to thread between the raft deck edges and the inboard side of the pontoons after the leading lateral arm is detached from its pontoon saddle.

* * * * *

UNITED STATES PATENT OFFICE
CERTIFICATE OF CORRECTION

Patent No. 3,744,070          Dated July 10, 1973

Inventor(s) Robert H. Shaw

It is certified that error appears in the above-identified patent and that said Letters Patent are hereby corrected as shown below:

Claim 6, change "A system for transporting and launching a pontoon raft" to --A pontoon raft or the like with a deck portion having land and water supporting means--.

Signed and sealed this 15th day of January 1974.

(SEAL)
Attest:

EDWARD M. FLETCHER, JR.          RENE D. TEGTMEYER
Attesting Officer                Acting Commissioner of Patents